United States Patent Office 3,636,018
Patented Jan. 18, 1972

---

3,636,018
ESTERS OF 2,7,11-TRIMETHYL-3-METHYLENE-4,6,10-DODECATRIENOIC ACID USEFUL AS INSECTICIDES
Karel Hejno, Vaclav Jarolim, Karel Slama, and Frantisek Sorm, Prague, Czechoslovakia, assignors to Ceskoslovenska Akademie Ved, Prague, Czechoslovakia
No Drawing. Filed July 24, 1969, Ser. No. 845,127
Int. Cl. C07c *69/52, 69/66;* A01n *9/24*
U.S. Cl. 260—410.5      10 Claims

ABSTRACT OF THE DISCLOSURE

Methods employing and compositions comprising novel esters of 2,7,11 - trimethyl-3-methylene-4,6,10-dodecatrienoic acid which are useful for the control of insects.

---

This invention relates to methods and compositions for the control of insects. More particularly, the present invention relates to methods and compositions for the control of insects, to novel esters of 2,7,11-trimethyl-3-methylene-4,6,10-dodecatrienoic acid and to novel intermediates.

A number of substances are known which have juvenile hormone activity demonstrated by stimulation of larval development, inhibition of metamorphosis and stimulation of ovarian growth in adult females. Most of these substances posses a farnesane or bisabolane system. Farnesol, methyl 10,11-epoxy-farnesoate, esters of dihydro-dichlorofarnesoic acid, the juvenile hormone (methyl 10,11-oxido-3,11-dimethyl-7-ethyltrideca-2,6-dienoate) isolated from *Platysamia cecropia,* juvabione, dehydrojuvabione, and derivatives of p-(1,5-dimethylhexyl)benzoic acid may be given as examples. See Romanuk et al., Proc. Nat. Acad. Sci. 57, 349 (1967); Roeller et al., Angew. Chem. Internat. Edit. 6, 179 (1967); Bowers et al., Life Sciences (Oxford) 4, 2323 (1965); Canadian Pat. 795,805 (1968) and U.S. Pat. 3,429,970 (1969). Some compounds of this type exhibit high activity when applied topically to the insect, stimulate its development and prevent formation of sexually mature adults. Compounds exhibiting this activity may be envisaged as potential insecticides or pesticides of the third generation.

The compounds of the present invention act selectively on certain harmful insects and, moreover, exhibit high sterilizing properties. Compounds, the preparation and application of which is described herein, represent novel analogs of the insect juvenile hormone with a specific activity for some insects which are considerably resistant to known analogs.

The novel esters of 2,7,11-trimethyl-3-methylene-4,6,10-dodecatrienoic acid of the present invention are represented by Formula I:

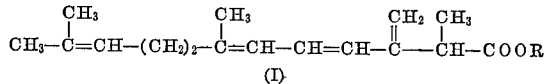

(I)

wherein R is lower alkyl, aralkyl or cycloalkyl.

The term "lower alkyl," as used herein, refers to a straight or branched chain saturated aliphatic hydrocarbon group having a chain length of one to six carbon atoms, such as methyl, ethyl, propyl, i-propyl, t-butyl, pentyl and n-hexyl. The term "cycloalkyl," as used herein, refers to a cycloalkyl group having four to eight carbon atoms, such as cyclobutyl, cyclopentyl, and cyclohexyl. The term "aralkyl," as used herein, refers to an aralkyl group having seven to twelve carbon atoms, such as benzyl, phenylethyl and naphthylmethyl.

The compounds of Formula I are prepared by a process which comprises reacting pseudoionone (6,10-dimethyl-undeca-3,5,9-trien-2-one) with esters of alpha-halopropionic acid of Formula II:

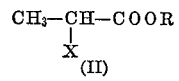

(II)

in which R is as defined above and X is bromo or chloro, in the presence of zinc in an organic solvent inert to the reaction to obtain the corresponding hydroxy ester of Formula III:

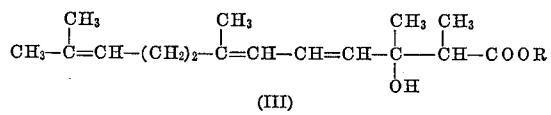

(III)

in which R is as defined above and subjecting the hydroxy ester to dehydration.

The reaction of pseudoionone with esters of alphahalopropionic acid can be carried out using any organic solvent inert to the reaction, for example, hydrocarbon solvents, aliphatic, acylic or aromatic, such as pentane, hexane, benzene, xylene and toluene and ethers, aliphatic or cyclic, such as tetrahydrofuran, ethyl ether, butyl ether and dioxane. The reaction temperature is not critical and generally a temperature of about room temperature to reflux temperature is employed, preferably reflux temperature. Equi-molar proportions are generally employed or a slight excess of the alpha-halopropionate in proportion to pseudoionone. The amount of zinc employed can vary considerably but generally not less than one molar equivalent based on the amount of alpha-halopropionate present in the reaction mixture.

The hydroxy ester (III) is dehydrated to obtain the ester of Formula I using, for example, phosphorus oxychloride in pyridine or p-toluenesulfonic acid at a temperature above room temperature, generally above 50° C., and more preferably, from about 90 to 100° C. The dehydration can be carried out in the presence or absence of a co-solvent which can be the same organic solvent as used in the first step of the process or a different organic solvent inert to the reaction.

In accordance with the present invention, there is provided a method for the control of insects which comprises contacting the insects with a compound selected from those of Formula I above in an amount effective to inhibit the metamorphosis of said insects. To aid in achieving a uniform distribution or application, it is advantageous to employ a composition comprising an inert carrier and, as the essential active ingredient, a compound of Formula I. One method for the control of insects in accordance with the present invention is to apply the composition comprising an inert carrier and a compound of Formula I to the locus of insect infestation, such as to the plant life on which the insects live. These compositions can be either solid or liquid. Solid compositions for treating insects can be prepared by incorporating the active compound with an inert carrier, such as finely divided talc, silica, pyrophyllite or clay or granular inert carriers, such as the vermiculites. Liquid compositions can be prepared by mixing the active compound with inert carriers, such as acetone, xylene, peanut oil, cottonseed oil, sesame oil and other vegetable oils and mineral oils conventionally employed as carriers in insecticidal formulations for application by spraying. Emulsions containing the active gredient can also be used. Other ingredients can be present in the compositions of the present invention to aid in the effective application of the active ingredient, such as wetting agents, dispersing agents, insect attractants, and the like. The concentration of active ingredient of a compound of Formula I in the composition can vary greatly and will depend on a variety of factors, such as the specific insect involved, degree of insect infestation, locus of insect infestation, environmental and weather conditions and type of application device used. Generally, the composition will contain less than 95% by weight of the active ingredient and more frequently less than 10% by weight. The compounds of Formula I are useful insect control agents by virtue of their ability to inhibit the metamorphosis of the insect. The expression "to inhibit the metamorphosis of said insect," as used herein, and in the appended claims, is used to describe the direct insecticidal effect of the compounds of Formula I as well as well as the indirect insecticidal effect of said compounds. In some cases the compounds have a direct insecticidal effect in that the insect dies upon contact with a compound of Formula I, particularly when the compound is applied at the egg stage and larvae stage of the insect's life. In other cases, the compounds of the present invention have an indirect insecticidal effect in that upon contact with a compound of Formula I during the egg stage, larvae stage or pupa stage, the insect is unable to pass from one metamorphic stage to the next in a normal manner and eventually dies without reproducing.

The following examples are presented to illustrate the present invention.

EXAMPLE 1

Preparation of methyl 2,7,11-trimethyl-3-methylene-4,6,10-dodecatrienoate

A solution is prepared from pseudoionone (19.2 g.), methyl α-bromopropionate (18.4 g.), and absolute benzene (80 ml.). One fifth of this solution is added to crude zinc powder (7.2 g.) which had been placed into a three-necked flask equipped with a mechanical stirrer, a dropping funnel, and a reflux condenser. The reaction mixture is gently heated and when the reaction starts, the remaining solution is cautiously added in the course of 20 minutes. The whole mixture is then refluxed for one hour, cooled, poured onto ice, acidified with dilute sulfuric acid, and extracted with ether (100 ml.). The ethereal extract is washed with water, dried and evaporated. Twenty-six grams of the residual hydroxy ester (III; R is methyl) is then subjected to dehydration as follows. The hydroxy ester is added dropwise at room temperature in the course of 20 minutes to a stirred mixture consisting of phosphorus oxychloride (11 ml.), absolute pyridine (57 ml.), and absolute benzene (120 ml.). The whole mixture is then heated at 100° C. for one hour, poured onto ice, acidified with dilute sulfuric acid, extracted with ether (50 ml.), the ethereal layer separated, washed with water, aqueous sodium hydrogen carbonate, and water, dried and evaporated. The crude residue is then distilled in vacuo. The fraction boiling at 132–134° C./0.01 mm. Hg contains the required methyl ester; yield, 17 g. The analytically pure specimen is obtained by chromatography on a column of a 20-fold amount of silica gel (previously deactivated by the addition of 12% of water) with the use of a petroleum ether-ether (20:1) solvent mixture as the eluting agent. For $C_{17}H_{26}O_2$ (262.4) calculated: 77.81% C, 9.99% H; found: 77.80% C, 9.89% H. The infrared spectrum exhibits absorption bands due to the carboxylic function, and bands pointing to the presence of a methylene double bond and a conjugated system of double bonds. The product contains 4 double bonds and the isopropylidene group. When subjected to the gas chromatography, the product exhibits 4 peaks which correspond to 4 isomers. The isomers may be separated by preparative gas chromatography at 190° C. on a 75 cm. column packed with silanised Chromosorb containing 5% of Apiezon L. The adsorption chromatography may be performed on a 150-fold amount of silica gel impregnated with 15% of silver nitrate and previously deactivated by the addition of 12% of water, and with the use of petroleum ether containing 5% of ether as the eluting agent.

EXAMPLE 2

Preparation of ethyl 2,7,11-trimethyl-3-methylene-4,6,10-dodecatrienoate

The preparation is performed in analogy to Example 1 except for the use of ethyl α-bromopropionate. The title compound boils at 142–145° C./0.01 mm. Hg. For $C_{18}H_{28}O_2$ (276.4) calculated: 78.21% C, 10.21% H; found: 77.88% C, 10.19% H.

EXAMPLE 3

Preparation of benzyl 2,7,11-trimethyl-3-methylene-4,6,10-dodecatrienoate, Method A The preparation is performed in analogy to Example 1 with the use of benzyl α-bromopropionate (17.7 g.), pseudoionone (9.6 g.), and powdered zinc (3.3 g.). The dehydration is carried out with the use of phosphorus oxychloride (5.5 ml.), absolute pyridine (28 ml.), and absolute benzene (60 ml.). Yield, 8.5 g. of the title benzyl ester, B.P. 185° C./0.01 mm. Hg. For $C_{23}H_{30}O_2$ (338.5) calculated: 81.63% C, 8.94% H; found: 81.40% C, 8.80% H.

EXAMPLE 4

Preparation of benzyl 2,7,11-trimethyl-3-methylene-4,6,10-dodecatrienoate, Method B A mixture of methyl 2,7,11-trimethyl-3-methylene-4,6,10-dodecatrienoate (2.5 g.), benzyl alcohol (2.2 g.), aluminum ethoxide (0.1 g.) and p-phenylenediamine (0.2 g.) is heated in the atmosphere of nitrogen at 120° C. for ten hours. Methanol set free by the reaction is removed by distillation. The residual reaction mixture is diluted with ether and then washed with 3% aqueous sulfuric acid and then water until neutral. The solvents are evaporated and the residue is distilled in vacuo. Yield, 2 g. of the title benzyl ester, the properties of which are identical with those of the specimen obtained according to Example 3.

TESTING OF THE JUVENILE HORMONE ACTIVITY

Two types of tests were used to determine the juvenile hormone activity of novel esters according to the present invention.

(a) In the topical assay, test substances were applied to abdominal tergites of freshly moulted larvae of the last instar of Hemiptera as acetone solutions of 1 μl. drops per specimen (the acetone solutions were diluted 1:10, 1:100, 1:1000, etc.).

(b) In the injection assay, test substances were injected in 1 μl. olive oil into the body cavity in dilutions analogous to those in the topical assay. The injection assay was used in combination with the topical assay, especially with freshly moulted pupae of Coleoptera and Lepidoptera.

The juvenile hormone activity was evaluated from the degree of the morphological inhibition of metamorphosis. With larvae of Exopterygote insect, the application of esters according to the present invention results in formation of giant larvae or the so-called half-larval half-imaginal adultoids. In the case of Endopterygote insect pupae, intermediary forms between pupa and imago or monstrous secondary pupae results.

The juvenile hormone activity of esters according to the present invention is shown in the following table and is expressed in units indicating the amount of the substance in micrograms per specimen which caused formation of half-larval adultoids (with Hemiptera) or half-pupal adultoids (with beetles and butterflies). The range of the juvenile hormone activity varies by one order of magnitude with Hemiptera and by two to three orders of magnitude with beetles. Thus, e.g., when the activity unit is 0.05 μg. per specimen, the substance will show first signs of activity when applied at approximately 0.01 μg.

per specimen, and maximum activity when more than 0.1 µg. per specimen is applied.

TABLE

Topical application to last-instar larvae of:

|  | First sign of activity | Activity unit | Compound |
|---|---|---|---|
| *Pyrrhocoris apterus* | 1 | 5 | A |
|  | 1 | 5 | B |
| *Dysdercus cingulatus* | 0.4 | 1 | A |
|  |  |  | B |
| *Graphosoma italicum* | 0.08 | 0.5 | A |
|  | 0.05 | 0.1 | B |

In the above table, Compound A is the methyl ester of 2,7,11 - trimethyl-3-methylene-4,6,10-dodecatrienoic acid and Compound B is the ethyl ester of 2,7,11-trimethyl-3-methylene-4,6,10-dodecatrienoic acid.

Esters according to the present invention show a specific activity on Hemiptera, particularly the family Pentatomidae (Eurygaster, Aelia), the very serious grain pests. With some species, the activity unit is lower than 1 microgram for specimen. Esters according to the invention show a higher activity on Graphosoma than on the very susceptible hemiptera Pyrrhocoris and Dysdercus. Moreover, the esters according to the invention are inactive to beetles and butterflies in amounts up to 1000 micrograms and, for this reason, may be considered as a new type of selective insect control agent with juvenile hormone effects.

EXAMPLE 5

Compositions useful for the control of insects in accordance with the present invention are exemplified by the following which are applied by spraying from spray rigs or by use of pressurized containers. Parts are by weight.

(1)

| | Parts |
|---|---|
| Ethyl 2,7,11 - trimethyl - 3-methylenedodeca-4,6,10-trienoate | 5 |
| Xylene | 95 |

(2)

| | |
|---|---|
| Methyl 2,7,11 - trimethyl-3-methylene dodeca-4,6,10-trienoate | 10 |
| Cottonseed oil | 90 |

(3)

| | |
|---|---|
| Benzyl 2,7,11 - trimethyl - 3 - methylenedodeca-4,6,10-trienoate | 15 |
| Sesame oil | 85 |

What we claim is:
1. A compound selected from those having the Formula I:

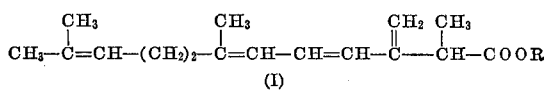

wherein R is lower alkyl, aralkyl or cycloalkyl.

2. A compound according to claim 1 wherein R is lower alkyl.
3. A compound according to claim 1 wherein R is methyl or ethyl.
4. A compound according to claim 1 wherein R is benzyl.
5. A compound selected from those having the Formula III:

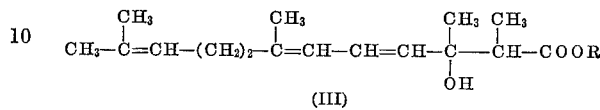

wherein R is lower alkyl, aralkyl or cycloalkyl.

6. A compound according to claim 5 wherein R is lower alkyl.
7. A compound according to claim 5 wherein R is methyl or ethyl.
8. A compound according to claim 5 wherein R is benzyl.
9. A process for the preparation of a compound having the Formula I:

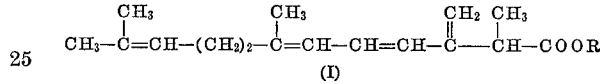

wherein R is lower alkyl, aralkyl or cycloalkyl, which comprises reacting pseudoionone with a compound having the Formula II:

wherein X is bromo or chloro and R is as defined above, in the presence of zinc in an organic solvent inert to the reaction to obtain a hydroxy ester having the Formula III:

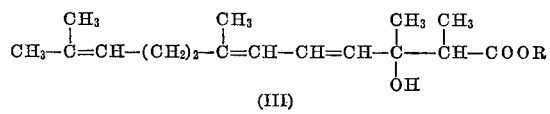

wherein R is as defined above and subjecting the hydroxy ester to dehydration.

10. The process of claim 9 in which the reaction of pseudoionone with a compound of Formula II is conducted under reflux and the thus-obtained hydroxy ester is dehydrated using phosphorus oxychloride in pyridine or by the action of p-toluenesulfonic acid.

References Cited
UNITED STATES PATENTS
2,928,854   3/1960   Bolhofer _____ 260—413

LEWIS GOTTS, Primary Examiner
D. G. RIVERS, Assistant Examiner

U.S. Cl. X.R.
260—410, 410.9 R; 424—312